3,729,370
PREPARATION OF VINYL-COATED POLYURETHANE FOAMS

David S. Cobbledick, Kent, Ohio, assignor to The General Tire & Rubber Company, Akron, Ohio
No Drawing. Application Aug. 31, 1970, Ser. No. 68,559, now Patent No. 3,691,265, which is a continuation-in-part of application Ser. No. 783,402, Dec. 12, 1968, now Patent No. 3,586,649. Divided and this application Apr. 12, 1972, Ser. No. 243,457
Int. Cl. B32b 3/26
U.S. Cl. 161—160                3 Claims

ABSTRACT OF THE DISCLOSURE

Certain combinations of polyurethane foam ingredients which react essentially at room temperature are mixed and poured into vacuum-formed polyvinyl sheeting and allowed to cure thereby producing a polyurethane foam with a strongly adherent polyvinyl coating.

CROSS-REFERENCE TO RELATED APPLICATIONS

This application is a division of U.S. patent application Ser. No. 68,559, filed Aug. 31, 1970, now U.S. Pat. 3,691,265 which in turn is a continuation-in-part of U.S. patent application Ser. No. 783,402, filed Dec. 12, 1968, now U.S. Pat. 3,586,649.

BACKGROUND OF THE INVENTION

Polyurethane plastics and foams have experienced fantastic growth in the quantities of such materials that are being used in commerce for an ever-increasing number of purposes. Polyurethanes can be varied in foam and properties from hard, tough plastics to very light weight foams by altering the components of the mixtures used to form the polyurethane. Fundamentally, such products are prepared by reacting a polyisocyanate with compounds having a plurality of groups containing one or more labile hydrogen atoms, such as amine groups, hydroxyl groups, carboxyl groups and the like. The reaction is generally accelerated by catalysts which promote the urethane forming reaction. The active-hydrogen-containing material is ordinarily a polyol or equivalent polyhydroxy compound or a mixture comprising a major portion of such material. In the case in which foams are the desired end a small amount of water and/or an organic pneumatogen, i.e., blowing agent, such as a fluorocarbon, is incorporated into the polyurethane forming mixture. The foam-producing compositions also may incorporate a foam stabilizer, and silicone block copolymers are now conventionally used for this purpose.

The present invention is concerned with polyurethane products which are of the foam type. Polyurethane foam broadly may be an opened or closed cell and may be flexible, semi-rigid or rigid. The new improvements described herein concern foams which are opened or closed cell and which are flexible or semi-rigid. This invention does not concern the rigid type of foams.

Three basic techniques can be employed for the production of polyurethane foams, viz, a complete prepolymer system, a quasi prepolymer system and a one-shot system (cf. U.S. 3,044,971). The new improvements described herein can be applied to any of these different systems of polyurethane foam production.

Polyurethane foams are frequently produced in large sections from which portions of suitable size and shape are cut, e.g., a rectangular pad for the seat of an upholstered sofa or chair. On the other hand, it is possible to cast a foam-forming material in a suitable shaped mold so that the foam structure when finally formed and cured will possess a complex shape which would not have been easily obtainable by cutting from a large block, e.g., crash pads, arm rests, and head rests for automobiles and similar specially shaped products.

It is frequently advantageous for shaped foam structures to be provided with a tough outer film or skin to protect the main body of foam and/or to give the foam structure an attractive appearance. A skin of this type on the foam can be created by spraying or otherwise coating said foam products with a suitable film-forming composition. Yet another method is to coat a previously molded foam part with a vinyl resin plastisol coating and then fuse the plastisol onto the foam part. As an alternative, such an outer film or skin has been created on polyurethane foams by covering the interior surface of a shaping mold into which the foam-foaming material is cast with a liquid or paste of non-foaming plastic material. Then when the foam-forming composition is cast in the mold and foamed in contact with the coating on the mold surface, a foam structure is obtained with an integral skin. Another method of forming the foam with a skin is to vacuum form a modified vinyl plastic sheet to the desired shape and then pour in foam-forming material.

The invention described and claimed in U.S. patent application Ser. No. 783,402 was specifically concerned with polyurethane foam structures which possess an integral skin but which are made by a different procedure and which have certain properties or characteristics not obtainable heretofore in the integral skin foam structures.

Regardless of the method of production of a skin surface on a foam molded part, top finishes or coatings covering the skin are generally necessary for acceptance by the end user. For example, such finishes or coatings provide the matching color for interior trim, give proper gloss, durability and scuff resistance and other characteristics needed for the end use. Obviously, it is highly detrimental for the molded foam part to cause such surface finishes or coatings to discolor when the final product is exposed to ultraviolet light, particularly when color matching among separate parts to a vehicle interior must be maintained, since such discoloration becomes immediately apparent.

Polyurethane foam systems have now been developed which require no oven cure to build up the physical properties of the foam products. Such cold-cure systems offer the foam processor the advantages of fast mold turnover and low capital expenditures because fewer molds and no ovens are required. However, previously known cold-cure urethane foams have had one or more drawbacks including disappointing physical properties, especially tear strengths and elongations at break, poor natural adhesion to polyvinyl plastic sheeting when foamed in place and a tendency to stain or discolor white or light-colored polyvinyl plastic sheeting which is adhered to the foam, usually by an adhesive layer.

Polyurethane foam structures with an integral skin can be obtained without need to apply a skin-forming composition (cf. U.S. 3,099,516). This has been accomplished by adjusting the temperature of the molding surface relative to the foam-forming mixture. In a further modification, there is added to the foam-forming mixture an aromatic diamine having active hydrogen groups plus other groups which moderate the reaction of the diamine with the other constituents of the foam-producing mixture, especially methoxy and halogen groups, e.g., methylene-bis-orthochloroaniline (cf. French Pat. No. 983,926). In such operations, the thickness and other characteristics of the integral skin on the resulting foam structure is to some extent controlled by the temperature of the mold at the time of casting of the foam-forming material so that the integral skin may vary from a very thin covering of little strength to a relatively thick skin separated from the central light-weight foam body by an intermediate dense foam zone.

It is also known in the techniques for producing polyurethane structures to use graft polymers of an ethylenic monomer on a polyol backbone as an active hydrogen material employed in the polyurethane forming reaction to create the final polymer (see U.S. Pat. No. 3,383,351). As an example, such prior development proposes for use as a polyol component of a polyurethane forming composition a graft polymer prepared by polymerizing an unsaturated material, e.g., styrene or an acrylic ester, on a polypropylene ether diol terminated with hydroxyl radicals.

In U.S. patent application Ser. No. 783,402 the invention comprised the modification of the conventional compositions for the forming of polyurethane foam structures by including in such compositions a combination of an aryl diamine and a polyhydroxy-containing graft polymer of an unsaturated monomer on a polyol backbone polymer. More specifically the invention comprised the forming of a polyurethane foam structure with compositions containing the aforementioned combination of diamine and graft polymer by heating the composition to a controlled temperature prior to casting into a mold of from about 10 to 85° C. and casting the heated polymer mixture in a mold having a temperature adjusted to a predetermined value of from about 5 to 85° C.

It has now been verified that the cold-cure foam system disclosed in U.S. patent application Ser. No. 783,402 produces foams which not only have good tear strength and good elongation and minimal vinyl discoloration but which also have excellent adhesion to polyvinyl plastic sheeting when foamed in contact with said sheeting, thereby eliminating the need for an adhesive layer between the foams and the sheeting.

It is the principal object of this invention to provide a novel method of preparing composite articles of polyurethane foam and polyvinyl plastic sheeting. It is a further object to provide such a method which requires no separate adhesive layer between the foam and the sheeting. It is a still further object to provide such a method in which no oven cure of the resulting composite article is necessary. Another object is the production of such a composite article in which the tear strength, cut resistance and elongation of the foam are satisfactory and there is little or no staining of the polyvinyl sheeting by the foam even when exposed to ultraviolet light. These objects as well as other objects and advantages which are obvious from the description and claims herein are satisfactory by this invention.

SUMMARY OF THE INVENTION

This invention comprises a method of making a composite article which comprises:

(1) vacuum forming polyvinyl plastic sheeting in a mold having a temperature adjusted to a predetermined value of from about 5 to 85° C.;

(2) pouring into the resulting vacuum-formed polyvinyl plastic sheeting a polyurethane foam mixture containing:
  (a) an organic polyisocyanate,
  (b) at least one aryl diamine selected from the group consisting of (A)

in which R is halogen or methoxy, (B)

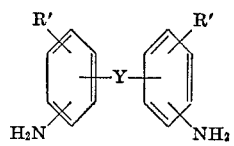

in which X is an oxygen atom, a sulfonyl group $$-\overset{O}{\underset{O}{\overset{\|}{S}}}-$$

a bond joining the two aromatic rings or an alkylene group of one to ten carbon atoms and in which each R′ is hydrogen, halogen (Br, Cl, F or I) or methoxy, at least one R′ being halogen or methoxy, (C)

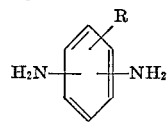

in which Y is thio, polythio, seleno, polyseleno, telluro or polytelluro and in which each R′ is hydrogen, halogen (Br, Cl, F or I) or methoxy, and (D) a mixture of at least one aryl diamine of said group of A, B and C and up to 50 mol percent of said mixture of at least one aryl diamine seelcted from the group consisting of

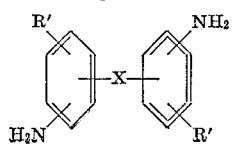

in which X is as defined above, (c) a polyol having an average molecular weight from about 400 to 15,000 prepared by polymerizing an ethylenically unsaturated monomer in contact with an organic polyol, said monomer being substantially free of acive hydrogen groups reactive with —NCO groups,
  (d) a polyurethane forming catalyst,
  (e) an organic pneumatogen,
  (f) a silicone block copolymer, and
  (g) optionally, a polyether polyol or polyester polyol having an average molecular weight between about 400 to 10,000, and (3) allowing the cast polymer mixture to foam and cure.

The improved method of this invention produces nonrigid polyurethane foam structures having as a cover layer a polyvinyl plastic sheeting adhered thereto. The foam structures comprise the reaction product of:

(a) an organic polyisocyanate,
(b) an aryl diamine or mixture thereof as shown above,
(c) a polyhydroxy-containing graft polymer as shown above, and
(g) optionally, a polyether polyol or polyester polyol having an average molecular weight between about 400 and 10,000.

DESCRIPTION OF PREFERRED EMBODIMENTS

The first essential components of foam-forming mixtures of the invention is an organic polyisocyanate. The polyisocyanates are preferably diisocyanates but also tri- or poly-functional isocyanates can be used with the diisocyanates. Examples of polyisocyanates which may be used are: 1,4-butylene diisocyanate, hexamethylene diisocyanate, m-xylylene diisocyanate, p-xylylene diisocyanate, 2,4-dimethyl-1,3-xylylene diisocyanate, m-phenylene diisocyanate, p-phenylene diisocyanate, 1-methyl phenylene-2,4-diisocyanate, 3-(α-isocyanato ethyl)-phenyl isocyanate, 1-methyl phenylene-2,6-diisocyanate, 2,6-diethyl phenylene-1,4 - diisocyanate, diphenylmethane-4,4′-diisocyanate, diphenyl-dimethyl-methane - 4,4′ - diisocyanate or naphthylene-1,5-diisocyanate. Isocyanates with more than two spaced —NCO groups may also be used, such as for example, the poly phenylene poly isocyanates. Additional polyisocyanates, useful in making polyurethane foams, are known in the art, e.g., see U.S. Pat. Nos. 3,036,996; 3,208,959 and 3,285,879. Mixtures of different diisocyanates are commonly used in preparing the foams.

The second essential component of the new methods and products is an aryl diamine of the type hereinbefore defined. With this class of materials from which either single compounds may be used in carrying out the invention or mixtures of two or more such compounds, a preferred group of the diamines are those having the following formula:

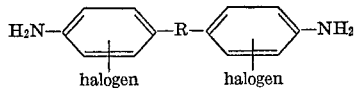

wherein is a 1 to 3 carbon atom alkylene radical, e.g., methylene, ethylene, etc. Most advantageous results are obtained with alkylene-bis-chloroanilines, especially where the alkylene group is methylene.

Another group of very useful diamines are those having the following formula:

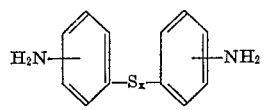

wherein $x$ is an integer, e.g., 1, 2, etc.

Specific examples of aryl diamines for use in the invention are:

methylene-bis-orthochloroaniline
3,3'-dichlorobenzidine
3,3'-dimethoxybenzidine
3-amino-4-chloroaniline
bis(4-amino-3-chlorophenyl)oxide
bis(4-amino-2-chlorophenyl)propane
bis(4-amino-2-chlorophenyl)sulfone
bis(4-amino-3-methoxyphenyl)decane
3-dimethyoxy-4-aminoaniline
bis(4-aminophenyl)sulfide
bis(4-aminophenyl)telluride
bis(4-aminophenyl)selenide
4-bromo-1,3-phenylenediamine
bis(4-amino-3-methoxyphenyl)disulfide
4,4'-methylene bis (2-iodoaniline)
4,4'-methylene bis (2-bromoaniline)
4,4'-methylene bis (2-fluoroaniline)
4,4'-methylene bis (2-isopropylaniline)
4-aminophenyl-2-chloroaniline Additional examples of specific compounds with the formulae hereinbefore stated that may be used can be found in U.S. Pat. No. 3,036,996, the disclosure of which is incorporated herein be reference. Further examples of diamines usable in polyurethane foam products are found in U.S. Pats. Nos. 3,261,813; 3,285,879 and 3,316,220.

With the sulfur, selenium and tellurium containing diamines it is not necessary that they be substituted with halogen or methoxy groups. However, in the case of hydrocarbon diamines or those containing oxygen,

or alkylene linkages, if skin formation on the foam is desired, halogen or methoxy groups must be present to act as inhibitor groups or otherwise the diamines are too reactive to produce the desired skin forming operation. One inhibiting atom or group is sufficient in the bicyclic amines, but the preferred bicyclic amines contain two inhibiting atoms or groups.

Materials of this type are commercially available in technical grade or impure forms which may be satisfactorily used, e.g., "LD-813." Such commercial materials may contain triamines or other ingredients of functionality greater than two. However, such materials are not as advantageous as those which have a functionality of 2.0, sincet he higher functionality material tend to reduce tear resistance of the resulting foam structures.

Examples of non-substituted aryl diamines, or mixtures thereof, which can be mixed in an amount up to 50 mol percent with the amines, or mixtures thereof, i.e., (A), (B) and/or (C) above, are meta-phenylene diamine, para-phenylene diamine, naphthalene diamine, benzidine, bis-(4-amino-phenyl)methane, 4,4'-diaminobibenzyl, di(para-amino-phenyl)ether, 3,3'-diamino diphenyl sulfone, 4,4'-diamino-diphenyl sulfone and the like.

The third essential component for use in the production of the new foam structures is a polyhydroxy-containing graft polymer of a hydroxyl-free unsaturated monomer on a polyol backbone polymer. The graft copolymer appears to produce several unique results, viz, it helps in the formation of an integral skin and it eliminates the discoloration of surface coatings on the foam structures on exposure to ultraviolet light. There is also a cooperative effect between the aryl diamine and the graft polymer polyol. Thus, without the aryl diamine, the foam structure has poor tear strength and low elongation.

The graft polymer polyols which are usable in the invention are known. As the technology advances, it is probable that more equivalent materials will be developed that are also usable. With the information supplied herein it will be possible for those skilled in the art to ascertain by a few preliminary tests the suitability of any material within the class as described for producing foam structures within the scope of the invention.

Examples of suitable graft polymer polyol compositions and their method of preparation are to be found in U.S. Pats. Nos. 3,294,711, 3,304,278 and 3,383,351, the disclosures of which are incorporated herein by reference. These graft polyol compositions may contain minor amounts of polyol homopolymer and of vinyl homopolymer or of vinyl copolymer if more than one vinyl monomer was used during the graft polymerization.

Acrylic type monomers are used in forming the best graft polymer polyols for use in the invention. Acrylonitrile, methacrylonitrile and ethacrylonitrile are a preferred group of monomers. Vinyl lactams, e.g., 1-vinyl-2-pyrrolidone (see U.S. 3,053,801), form another preferred class of vinyl monomers.

The graft polymer polyols are products obtained by polymerizing or copolymerizing hydroxyl-free olefinically unsaturated monomers while dissolved in or while in contact with a polyol. A polyalkylene ether or a polyester containing a plurality of hydroxyl groups are examples of such polyols. The product obtained by polymerization of the vinyl monomers in contact with the polyol is in part a graft of the ethylenic monomer on the polyol backbone. It can contain some homopolymer of the ethylenic compound as well as some ungrafted polyol.

The molecular weight of the polyols depends in large measure on the end product desired. The optimum molecular weight is dependent on the number of groups containing active or labile hydrogen atoms, being large when the number of such groups is increased as the lengths of the branched chains between such groups are shorter for a given molecular weight. For the non-rigid foams of the invention, the molecular weight of triols is usually above 400 and preferably between 600 and 7500. Higher molecular weights may be used, however. When the number of hydroxyl groups is more than three, an increase in minimum molecular weight of the polyol above 500 is usually made to provide equivalent separation of hydroxyl groups.

The polyethers may be linear polymers such as polypropylene ether glycol or mixed condensates of propylene oxide and butylene oxide, allyl glycidyl ether and the like having only two hydroxyl groups, or they may be branched chain polyols having 2 to 6 hydroxyl groups such for example as the adducts of propylene oxide or other polymerizable monomeric oxide or mixture thereof on a polyhydric alcohol, such as glycerine, trimethylol propane, triethanol amine, pentaerythritol, sorbitol and the like, or with a compound such as ethylene diamine, or they may be mixed polyethylene-propylene oxide adducts on the polyhydric alcohols with 2 to 6 hydroxyl groups. Mixtures of polyols may also be used.

While polyethers are preferred for polymerization of vinyl monomers in contact therewith, some of the benefits of the present invention may be obtained when the polyol is a polyester such as the reaction product of adipic acid or sebacic acid with ethylene glycol, diethylene glycol, triethylene glycol, propylene glycol, butylene glycol and the like. Hydroxy oils such as castor oil and tall oil may also be used. The polyester is preferably saturated but can be slightly unsaturated such as those prepared by a process wherein a saturated acid such as adipic, phthalic and the like is substituted in minor part (less than 25%) by an unsaturated acid such as maleic or fumaric acids. The glycol component may also be unsaturated as for example monoallylether of trimethylol propane or 2 - butanediol-1,4.

The polyethers used in the preparation of the mixed polymerization product with vinyl monomer or monomers may also be unsaturated if desired as, for example, the polyether prepared by condensing dihydroxy polybutadiene with ethylene or propylene glycol, the diols prepared by copolymerizing propylene oxide with an unsautrated olefine oxide such as butadiene monoxide, allyl glycidyl ether, or crotyl glycidyl ether or the like. The polyol may also be a dihydric alcohol such as dihydroxy polybutadiene of molecular weight of over 500. Mixtures of the above polyols may also be utilized. When unsaturated polyols are used, care must be taken not to cross-link the material to such a degree that it is not liquid at a suitable reacting temperature or is not soluble.

Any one or more of the above polyols may be utilized as a backbone for grafting thereon a polymer of a hydroxyl-free vinyl compound by polymerizing the vinyl compound or vinyl monomer in admixture with said polyol. The preferred vinyl compounds have an olefinic double bond activated by having in conjugated relation therewith other double bonds such as are present in carbonyl groups, benzene nuclei or nitrile groups. Polymerizable vinyl compounds such as vinyl acetate which do not have conjugated double bonds but have ester or polar groups may also be used.

Examples of hydroxyl-free unsaturated monomers for grafting on polyols and/or for polymerizing in admixture with said polyols besides the preferred ones mentioned above are other acrylic type monomers, e.g., esters of acrylic and methacrylic acids such as methyl acrylate, ethyl acrylate, butyl acrylate, methyl methacrylate, ethyl methacrylate, n-hexyl methacrylate, glycol dimethacrylate and the like; vinyl esters, e.g., vinyl acetate and vinyl propionate; styrene, butadiene and alpha-methyl styrene.

In the preparation of the interpolymerization product of polymerizable monomer and polyol, the monomer is mixed with the polyol, for example, the polyalkylene ether, in the presence of a suitable initiator of polymerization, usually a free radical producing catalyst such as a persalt such as sodium persulfate, potassium persulfate or potasium perborate, or a peroxide such as hydrogen peroxide or an organic peroxide such as benzoyl peroxide, dicumyl peroxide, di-tertiary-butyl peroxide, tertiary butyl hydroperoxide, tertiary butyl perbenzoate or the like. Other free radical forming catalysts such as a,a,'-azobisisobutyronitrile are also suitable.

The well-known redox systems of polymerization such as those wherein a transition metal salt, such as a ferrous salt or a cobalt salt such as potassium cobaltinitrite, may also be used in combination with the peroxide and/or a suitable reducing agent which may be an amine or even excess hydroxy groups on the polyols themselves may act as a reductant. Such systems include those wherein cuprous salts are used in conjunction with hydrazine hydrate. Trivalent titanium salts in combination with amines, such as for example hydroxyl amines, are also excellent initiators of the polymerization of vinyl compounds such as acrylonitrile in the presence of the polyols. Radiation techniques for initiation of polymerization are useful.

The graft polymer polyols may also be prepared by polymerizing under sufficiently anhydrous conditions one or more of the olefinic (perferably monoolefinic) monomers in the presence of an ionic catalyst. In such systems the ionic catalyst, such as an alkali metal, for example, potassium, is reacted with polyalkylene glycol (including polyalkylene polyols generically), and the monomer is then added to the system. The alkali metal apparently forms an alcoholate linkage with a few of the hydroxyl groups in the polyol.

The vinyl monomer is usually polymerized in the polyol with continued agitation or stirring. A solvent for both the polyol and the vinyl monomer may be present if desired but is not necessary. In some cases, it may be desirable in order to accelerate the polymerization to add a small amount of a surfactant or a soap and some water so that polymerization occurs in emulsion form.

The vinyl monomer which is reacted in admixture with the polyol preferably has less than 10 aliphatic carbon atoms and preferably contains —CN or —CO— groups. When the percentage of monomer to polyol is about 5%, the improvement in the foam is substantially evident. As much as 50% of the grafted polyol may consist of polymerized unsaturated monomer units. Preferably, the graft polyol has an average molecular weight of from about 400 to 6500.

Advantageously, one uses as the polyhydroxy-containing graft polymer a reaction product of a vinyl monomer selected from the group consisting of acrylonitrile, methacrylonitrile and ethacrylonitrile with a polyoxyalkylene polyol having an average molecular weight of at least 400.

Advantageously, the new foam structures will be made from formulations having —OH group containing ingredients other than the required graft polymer polyol. Polyesters can be used for this purpose, but polyethers are preferred. The polyesters are not as hydrolytically stable as the polyethers. Partially (15% minimum) or fully primary hydroxyl-capped polyoxyalkylenes, e.g., diols, triols, tetrols, etc., with a molecular weight between about 400 to 7500 are preferred. Examples of other polyols conventionaly used in making polyurethane foams can be found in numerous publications, e.g., U.S. Pats. Nos. 3,036,996 and 3,285,879. These polyols, as contrasted with the required graft polymer polyols, may constitute up to about 70 percent of the —OH group containing component of the foam-forming formulations.

Any of the usual activators including a tertiary amine such as dimethyl benzyl amine, N-ethyl morpholine, per methylated diethylene tri amine and/or organo metal compounds are usually incorporated in order to accelerate the reaction (cf. U.S. 3,322,699). Also these can be used as catalysts as well as tin compounds such as tin octoate, dibutyl tin dilaurate, and so forth. A small amount of conventional cell stabilzer such as for example one of the silicone oils or any of the well-known stabilizers heretofore used for the commercial production of urethane foams are usable in the new methods. Silicone block copolymer oils known to the art for this use are preferred, e.g., silicone oil "L520," "L540," etc. Examples of other usable catalysts, activators and cell stabilizers, particularly silicone block copolymers, are given in U.S. Pats. Nos. 3,044,971; 3,060,137; 3,194,770 and 3,373,122, the disclosures of which are incorporated herein by reference. Such components are used in an amount required to perform their desired function as is known in the art, normally between about 0.001 to 2 percent of the total foamforming composition.

Suitable antidegradants for polyurethanes may be included in the formulation to protect against aging, particularly when exposed outdoors. See U.S. Pats. Nos. 2,915,496 and 3,208,959 on the use of alkyl substituted hydroxyl aryl compounds, alkyl and aryl substituted phosphites, N,N'-dialkyl substitued phenylene diamines, and halogenated organic phosphites. Other known polyurethane anti-degradants can be used. Some of this degration such as the common yellowing of the polyurethane can be offset to some extent by the use of light stable diisocyanates or polyisocyanates which are known in the art. The aliphatic diisocyanates, durene diisocyanate, t-butyl tolylene diisocyanate and others can be used although some of them are expensive and harzardous.

An organic pneumatogen is used to create a desirable overall light density in the foam structure. Advantageously, the pneumatogen is a fluorocarbon or mixture thereof. Water is generally to be avoided and only the water incidentally present as residual water in the polyol and amines, about up to 1% maximum, should be tolerated. Halogenated alkanes particularly the fluorinated alkanes having a boiling point below 80° C. give best results. Of such blowing agents trichlor-fluoromethane is usually preferred although other fluorinated alkanes having a boiling point between —50° C. and 110° C. or even higher, may be used if desired. The organic pneumatogen is used in an amount to give the required product density. For the prefered density and fluorocarbons, this component will amount to about 5 to 30 percent of the total foam-forming composition. Principles of the use of the fluorocarbons in the polyurethane foams are to be found disclosed in U.S. Pat. 3,072,582 which is incorporated herein by reference.

The amount of the graft polymer polyol used in polyurethane formulations prepared according to the invention may be varied although superior results are attained using certain proportions. In regard to a maximum proportion, the graft polymer polyol may constitute the only —OH group component of the polyurethane formulation. In regard to a minium proportion, sufficient should be used to inhibit UV discoloration of the coatings or finishes on the foam structure. Products having the best values in UV stability, tear strength and elongation are obtained when the graft polymer constitutes 30 to 70 percent of the total —OH component of the polyurethane formulation.

The amount of the aryl diamine used is in part dependent upon its molecular weight and the quantity of polyols used in the foam producing mixture. Generally, the ratio of such amine component plus total hydroxyl component to isocyanate component is adjusted to give an —NCO to —OH plus —NH$_2$ ratio of about 0.85:1 to 1.2:1. From about 3 to 35% by weight of the polyurethane results from reaction of NCO with the amine and from about 65 to 97% by weight results from reaction of the NCO with the OH. In the one-shot process all of the foam forming ingredients are mixed together at one time. Two or more streams of compatible and mixed ingredients are delivered to the mixing head of the machine to be mixed together and then poured or dropped into the container or conveyor. Foams of the present invention can also be made by the prepolymer or the quasi- or semi-prepolymer process. Thorough mixing of the ingredients is required to get complete (as much as theoretically possible) reaction. Incomplete mixing will result in some of the amines or impurities therein migrating to the surface and causing staining or discoloration. Good mixing alone without the graft polyol still gives discoloration. It is necessary to have good mixing and to use the graft polyol to avoid discoloration.

The foams as described herein are useful in making seats for bicycles, motorcycles and tractors; arm rests for automobiles and furniture; crash pads; head rests; weather-stripping; and exterior protective strips. These foams have a density of from about 2 to 6 lbs./ft.$^3$ for the predominating mass of the foam, a tear strength of from about 3 to 5 lbs./in. and an elongation of at least about 200%. Also, the wood in some furniture is being replaced with rigid polyurethanes. With the present invention, it is possible, after making the rigid frame, to cast the semi-rigid or flexible arm rest and flexible seats and back against the frame to make an integral piece of polyurethane furniture.

The method of this invention is operable with any polyvinyl plastic sheeting whether flexible or rigid. The term "polyvinyl plastic sheeting" includes articles derived from such materials as included in the above definition of vinyl compounds or vinyl monomers including homopolymers, random copolymers, block copolymers and graft polymers such as the types of copolymers disclosed in U.S. Pats. Nos. 2,746,944, 2,816,087, 2,843,562, 2,879,567, 2,947,719, 2,996,469, 2,996,470, 3,019,208 and 3,334,156. The commonest type of polyvinyl plastic sheeting is a polyvinyl chloride based material, but this invention is not limited to these materials. The polyvinyl plastic sheeting can be supported or unsupported and can be solid or foamed.

The following examples are illustrative and are not intended to limit this invention which is delineated in the claims. All quantities are recited as parts by weight or percentage by weight unless otherwise specified.

EXAMPLE 1

A typical white polyvinyl plastic sheet having a thickness of 40 mils and composed of 100 parts of a medium to high molecular weight polyvinyl chloride dispersion resin, 70 parts of plasticizer, 15 parts of filler, 2 parts of stabilizer and 0.5 part of lubricant was vacuum-formed in a plastic mold at ambient temperatures.

A foam-forming composition was prepared as follows:

Portion A

| Ingredient: | Parts |
| --- | --- |
| Partially primary hydroxyl-capped 6500 mol. wt. polyoxypropylene triol | 100 |
| Methylene-bis(2-chloroaniline) | 20 |
| Triethylene diamine (1,4-diaza[2,2,2]bicyclooctane) added as a solution in 1 part of dipropylene glycol | 0.5 |
| Stannous octoate | 0.14 |

Portion B

| Ingredient: | Parts |
| --- | --- |
| NCO terminated prepolymer prepared by reacting for 2 hours at 75–80° C. 122 parts of an 80/20 mixture of 2,4- and 2,6-toluene diisocyanate isomers with 100 parts of a graft polymer polyol made by polymerizing acrylonitrile in contact with polyoxypropylene triol of 3000 mol. wt. to give a graft polymer containing 20% acrylonitrile | 40 |
| Trichlorofluoromethane | 30 |
| Block copolymer surfactant of dimethylsiloxane and alkylene oxide units | 0.09 |

(A small part of the polyoxypropylene triol can be mixed with the tin catalyst to form a stable catalyst composition which is fed separately to the mixing head.)

Portions A and B can be homogeneously mixed at ambient temperature (usually about 25° C.) or Portion A can be preheated up to about 60° C. before mixing with Portion B. In this example Portions A and B were homogeneously mixed at ambient temperature and immediately cast into the vacuum-formed polyvinyl plastic sheeting also at ambient temperature. The resulting foam had risen to full height after about 3 minutes, and it was allowed to cure at ambient conditions for 15 minutes.

The resulting foam had the following properties:

| | |
| --- | --- |
| Density (lbs./cu. ft.) | 2.8 |
| Elongation (percent) | 225 |
| Tear (lbs./inch) | 3.85 |
| Vinyl adhesion (lbs./inch) | 3.85 |

A similar composite article was made except that in the preparation of the foam the amount of trichlorofluoromethane was increased to 32 parts and the amount of surfactant was reduced to 0.03 part. The resulting foam had the following properties:

| | |
|---|---|
| Density (lbs./cu. ft.) | 2.4 |
| Elongation (percent) | 270 |
| Tear (lbs./inch) | 3.7 |
| Vinyl adhesion (lbs./inch) | 3.7 |

Each of the compositie articles was heated for 3 weeks at 175° F. without staining the exposed surfaces of the respective white polyvinyl plastic sheets.

Similar results are obtained using other typical polyvinyl plastic sheeting with general formulations such as (i) 100 parts of a polymer alloy of 80 percent of a medium to high molecular weight polyvinyl chloride dispersion resin and 20 percent of a styrene-acrylonitrile resin, 70 parts of plasticizer, 15 parts of filler, 2 parts of stabilizer and 0.5 part of lubricant or (ii) 100 parts of resin-rubber alloy of 50 percent of a medium to high molecular weight polyvinyl chloride dispersion resin, 25 percent of a standard graft butadiene-styrene-acrylonitrile resin and 25 percent of a high nitrile content nitrile rubber, 26 parts of plasticizer and 2 parts of stabilizer.

By way of comparison, a typical commercially-available cold-cure polyurethane foam had the following advertised properties:

| | |
|---|---|
| Density (lbs./cu. ft.) | 2.6 |
| Elongation (percent) | 135 |
| Tear (lbs./inch) | 1.1 |
| Vinyl adhesion | (1) |

[1] Not given, but an adhesion of 1.1 lbs./inch would be the maximum meaningful value.

EXAMPLE 2

Similar results are obtained using the following foam-forming compositions:

(I)

Portion A

| Ingredient: | Parts |
|---|---|
| Partially primary hydroxyl capped 3,000 mol. wt. polyoxypropylene triol | 100 |
| Block copolymer of dimethylene siloxane and alkylene oxide "L-540" | 0.002 |
| Triethylene diamine (1,4-diaza[2.2.2.]bicyclooctane) (.5 part solution of the diamine in 1 part dipropylene glycol, 33LV Dabco) | 0.5 |
| Stannous octoate | 0.2 |
| Methylene-bis-orthochloroaniline "MOCA" | 20 |

Portion B

| Ingredient: | Parts |
|---|---|
| NCO terminated prepolymer prepared by reacting for 2 hours at 75–80° C. 41 parts of an 80/20 mixture of 2,4- and 2,6-toluene diisocyanate isomers with 100 parts of a graft polymer polyol made made by polymerizing acrylonitrile in contact with polyoxypropylene triol of 3000 mol. wt. to give a graft polymer containing 20 percent acrylonitrile | 97.5 |
| Trichlorofluoromethane "Freon 11" | 18 |

(II)

Portion A

| Ingredient: | Parts |
|---|---|
| Graft polymer polyol by an acrylonitrile (20%) graft on polypropylene (mol. wt. about 3000, partially ethylene oxide end capped) ether triol | 100 |
| "L-540" | 0.002 |
| "33LV" | 0.5 |
| Stannous octoate | 0.2 |
| "MOCA" | 20 |

Portion B

| Ingredient: | Parts |
|---|---|
| Tolylene diisocyanate | 20 |
| "Freon 11" | 9 |

(III)

Portion A

| Ingredient: | Parts |
|---|---|
| Propylene oxide adduct of a triol partially capped with ethylene oxide of 6500 mol. wt. (commercially available as SF-6500) | 50 |
| Graft polymer prepared by polymerizing 15 parts of acrylonitrile in contact with 85 parts of "SF-6500" polyol and 0.5 part of benzoyl peroxide at 80° C. for 24 hours (see U.S. Pat. 3,294,711) | 50 |
| "MOCA" | 20 |
| "33LV" | .5 |
| Stannous octoate | 0.2 |

Portion B

| Ingredient: | Parts |
|---|---|
| Prepolymer formed by mixing together 82 parts of tolylene diisocyanate and 100 parts of a polyol having a mol. wt. of 4500 which was a propylene oxide adduct of a triol partially capped with ethylene oxide during its manufacture | 46.5 |
| Silicone block copolymer ("L-540") | 0.2 |
| "Freon 11" | 20.0 |

EXAMPLE 3

A general formulation for a prepolymer system for preparing the desired polyurethane foam structure is:

Porton A

| Ingredient: | Parts |
|---|---|
| (a) Polyoxyalkylene polyol of mol. wt. 400–7500 at least 15% to fully primary hydroxyl capped | 70–95 |
| (b) Aryl diamine as herein defined, preferably halo- or methoxy substituted methylene-bisaniline | 5–30 |
| (c) Dimethylsiloxane oils or block copolymers of dimethylsiloxanes and alkylene oxides | 0.001–2.0 |
| (d) Tertiary amine catalyst | 0.1–5.0 |
| (e) Metallic catalyst, e.g., stannous octoate | 0.0–0.2 |

Portion B

| Ingredient: | Parts |
|---|---|
| (a) Urethane prepolymer of diisocyanates and vinyl grafted polyoxyalkylene polyol with mol. wt. between 400–7500 containing 5 to 50% vinyl graft component. Percent —NCO of prepolymer 2.5–33% | (1) |
| (b) Organic pneumatogen, e.g., trichlorofluoromethane | 5–30 |

[1] Portion B, Item (a), is used in an amount so that when Portions A and B are mixed, the mixture will have an —NCO to (—OH plus —NH₂) ratio of between 0.85 : 1.0 and 1.2 : 1.0.

EXAMPLE 4

A general formulation for semi-type prepolymer urethane foam system in accordance with the invention is:

Portion A (a) Partially (15% minimum) or fully primary hydroxyl-capped, vinyl grafted polyoxyalkylene diols, triols, tetrols, etc., with a molecular weight between 400 and 7500 containing 5% to 50% of the vinyl polymer.
(b), (c), (d), and (e)—Same as in Example 3.

Portion B (a) and (b)—Same as in Example 3.
Portions A and B should be mixed to give an NCO:(OH plus NH₂) ratio between 0.85:1.0 and 1.2:1.0.

Preferred processing conditions for prepolymer systems:
(a) Preheat Portion A to 35° to 60° C.
(b) Hold Portion B to 24° and 30° C.
(c) Machine mix.
(d) Curing conditions 10 minutes to 30 minutes at ambient temperature.

EXAMPLE 5

A general formulation for a one-shot polyurethane foam system in accordance with the invention is:

Portion A (a) Partially (15% minimum) or fully primary hydroxyl-capped, vinyl grafted polyoxyalkylene diols, triols, tetrols and the like with a molecular weight between 400 and 7500 contaiinng 5% to 50% of the vinyl polymer.
(b), (c), (d), and (e)—Same as in Example 3.

Portion B (a) Diisocyanate-toluene diisocyanate (80/20 or 65/35 mixtures of the 2,4- and 2,6-isomers), or p,p'-diphenylmethane diisocyanate.
(b) Same as in Example 3.

Components A and B should be mixed to give an NCO:(OH+NH$_2$) ratio between 0.851.0 and 1.2:1.0.

Preferred process conditions for one-shot system:

(a) Portion A—ambient temperature to 60° C.
(b) Portion B—hold between 24° and 30° C.
(c) Machine mix.

I claim:
1. A composite article comprising polyvinyl plastic sheeting having adhered thereto in the absence of separate adhesive a non-rigid polyurethane foam structure having a density of from about 2 to 6 lbs./ft.$^3$ for the predominating mass of the foam, a tear strength of from about 2 to 5 lbs./in., an elongation of at least 200% and comprising the reaction product of a mixture containing:
(a) an organic polyisocyante,
(b) at least one aryl diamine selected from the group consisting of

(A) 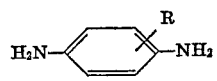

in which R is halogen or methoxy, (B) 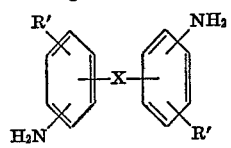

in which X is an oxygen atom, a sulfonyl group

a bond joining the two aromatic rings or an alkylene group of one to ten carbon atoms and in which each R' is hydrogen, halogen, or methoxy, at least one R' being halogen or methoxy, (C) 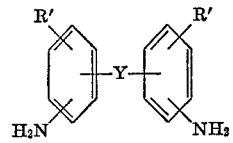

in which Y is thio, polythio, seleno, polyseleno, telluro or polytelluro and in which each R' is as defined above, and (D) a mixture of at least one aryl diamine of said group of A, B and C and up to 50 mol percent of said mixture of at least one aryl diamine selected from the group consisting of

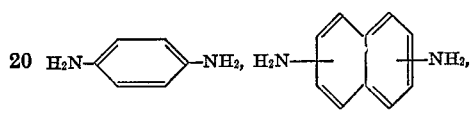

and 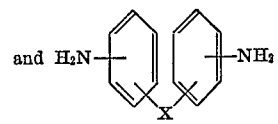

in which x is as defined above,
(c) a polyol having an average molecular weight from about 400 to 15,000 prepared by polymerizing an ethylenically unsaturated monomer in contact with an organic polyol, said monomer being substantially free of active hydrogen groups reactive with —NCO groups,
(d) a polyurethane forming catalyst, and
(e) an organic blowing agent for producing the foam, said article being characterized by substantial lack of discoloration on exposure to ultraviolet light of surface coatings attached to the skin.
2. An article as claimed in claim 1 in which component (a) is organic diisocyanate, component (b) is an alkylene-bischloroaniline and component (c) is a polyhydroxy containing graft polymer of acrylonitrile on a polyalkylene ether polyol backbone.
3. An article as claimed in claim 2 wherein component (c) is the product obtained by polymerizing acrylonitrile in contact with a polyoxyalkylene ether triol having a substantial amount of primary hydroxyl groups.

References Cited
UNITED STATES PATENTS 3,600,266  8/1971  Huntzinger _____ 161—160
3,632,533  1/1972  Winkler _____ 161—160

WILLIAM J. VAN BALEN, Primary Examiner

U.S. Cl. X.R.

156—79; 161—190; 260—2.5 BB, 2.5 AM; 264—45

UNITED STATES PATENT OFFICE
CERTIFICATE OF CORRECTION

Patent No. 3,729,370    Dated April 24, 1973

Inventor(s) David S. Cobbledick

It is certified that error appears in the above-identified patent and that said Letters Patent are hereby corrected as shown below:

Column 3, lines 49 and 50,   "satisfactory" should read ---satisfied---.

Column 3, lines 70-75, which reads:

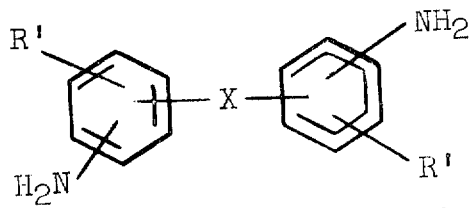

should read: 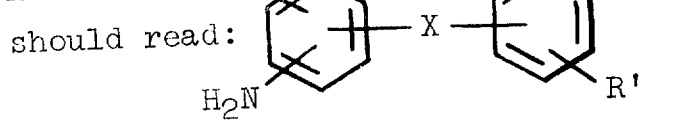

Column 4, line 24, which reads: "seelcted" should read ---selected---.

Column 5, line 7, which reads: "With" should read ---Within---.

Column 5, line 16, which reads: "wherein is a 1 to 3..." should read ---wherein R is a 1 to 3...---.

Column 6, line 2, which reads: "sincet he higher..." should read ---since the higher...---.

Column 8, line 9, which reads: "perferably" should read ---preferably---.

UNITED STATES PATENT OFFICE
CERTIFICATE OF CORRECTION

Patent No. 3,729,370     Dated April 24, 1973

Inventor(s) David S. Cobbledick

It is certified that error appears in the above-identified patent and that said Letters Patent are hereby corrected as shown below:

Column 8, line 61, which reads: "stabilzer" should read ---stabilizer---.

Column 9, line 21, which reads: "trichlor-fluoromethane" should read ---trichloro-fluoromethane---.

Column 11, line 59, which reads: "polyol made made by..." should read ---polyol made by...---.

Column 12, line 34, which reads: "Porton A" should read ---Portion A---.

Column 13, line 27, which reads: "0.851.0" should read ---0.85:1.0---.

Column 13, line 40, which reads: "2 to 5 lbs./in." should read ---3 to 5 lbs./in.---.

Signed and sealed this 12th day of February 1974.

(SEAL)
Attest:

EDWARD M. FLETCHER, JR.
Attesting Officer

C. MARSHALL DANN
Commissioner of Patents